Jan. 17, 1961 E. E. SCHNELL 2,968,264
SLIDE CONTROL MECHANISM FOR FERTILIZER DISTRIBUTOR
Filed Sept. 17, 1956 2 Sheets-Sheet 2

ERNST E. SCHNELL INVENTOR.

ATTORNEYS

United States Patent Office 2,968,264
Patented Jan. 17, 1961

2,968,264

SLIDE CONTROL MECHANISM FOR FERTILIZER DISTRIBUTOR

Ernst E. Schnell, West Bend, Wis., assignor, by mesne assignments, to Deere & Company, a corporation of Delaware Filed Sept. 17, 1956, Ser. No. 610,143

11 Claims. (Cl. 111—67)

The present invention relates generally to agricultural implements and more particularly to material dispensing mechanism, such as grain drills, fertilizer distributors and the like.

The objects and general nature of the present invention is the provision of a material dispensing apparatus in which material flow is controlled by the raising and lowering of the furrow opener operating rockshaft, with auxiliary means for completely shutting off the material flow independently of the position of the rockshaft.

More specifically, it is a feature of the present invention to provide means whereby the auxiliary flow-terminating mechanism is automatically released by a subsequent movement of the rockshaft into a furrow opener raised position, whereby when the furrow openers are again lowered into operating position, the flow control means is automatically opened.

These and other objects and advantages of the present invention will be apparent to those skilled in the art after a consideration of the following detailed description, taken in conjunction with the accompanying drawings, in which:

Fig. 4 is an enlarged fragmentary view, similar to Fig. 1, showing the overcenter position of the slide-controlling hand lever.

Figure 1:
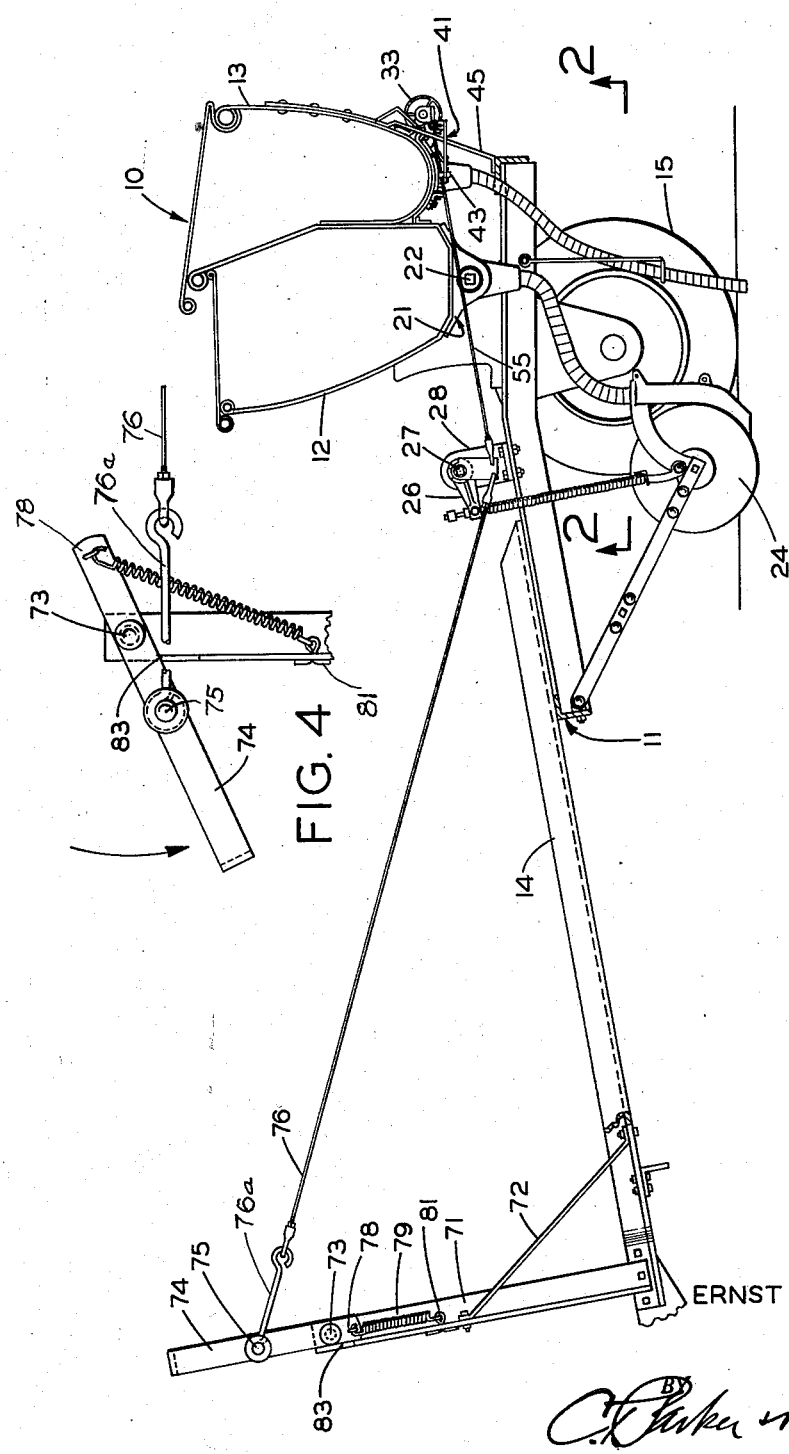
Fig. 1 is a vertical section view taken generally through the central portion of a grain drill in which the principles of the present invention have been incorporated, the grain drill being shown in operating position.

Referring first to Fig. 1, a grain drill in which the principles of the present invention have been incorporated is indicated in its entirety by the reference numeral 10 and includes a wheel supported frame structure 11 supporting seed and fertilizer hopper means indicated at 12 and 13, respectively, and a forwardly extending hitch frame 14. The ground wheels supporting the implement are indicated at 15.

The grain box or hopper 12 is mounted on the frame 11 ahead of the fertilizer hopper 13 and includes conventional seed selecting mechanism 21 that is actuated by a seed shaft 22. To provide furrows for receiving the seed, and fertilizer when the fertilizer is deposited with the seed, the grain drill of the present invention includes a plurality of furrow openers 24 movably connected with the frame 11 and raised and lowered by arms 26 mounted on a rockshaft 27 that is journaled by suitable bearing brackets 28 carried on the frame 11. In a grain drill of this type, the seeding and fertilizer operations are terminated whenever the furrow openers 24 are raised out of the ground and into a transport position. So far as the present invention is concerned, the rockshaft 27 may be rocked to raise the furrow openers by any suitable means, either hand operated, power operated, or traction operated, as desired. When seeding and fertilizing is to be resumed, the rockshaft 27 is rocked in a direction to lower the furrow openers into ground working position.

The bottom of the fertilizer hopper 13 is provided with a plurality of discharge openings, and slidable along the bottom of the hopper is a pair of quantity control slides 31 arranged in end-to-end relation. Each of these slides is provided with a plurality of openings adapted to be brought into different positions relative to the openings in the hopper bottom so as to control the amount of material dispensed through the openings. Any suitable means may be provided for shifting the slides 31, hand wheels 33 being shown in Fig. 1 as the preferred form.

Figure 2:
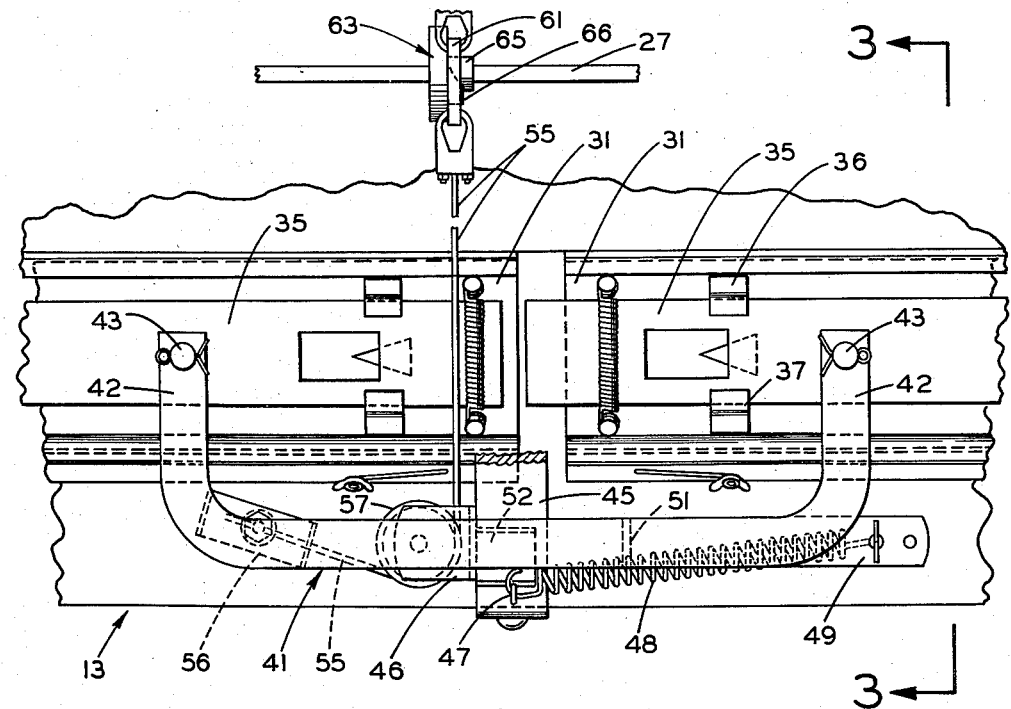
Fig. 2 is a bottom view, looking upwardly, generally along the line 2—2 of Fig. 1.

For the purpose of providing means for starting or terminating the flow of fertilizer at the same time that the furrow openers are raised and lowered, and without disturbing the adjustment of the quantity control slides 31, the present invention provides an auxiliary or shut-off slide 35 for each of the quantity control slides 31. As best shown in Fig. 2, the shut-off slides 35 are also disposed in end-to-end alignment and are carried, respectively, on the quantity control slides 31 by means of suitable brackets 36 and 37.

The two shut-off slides 35 are interconnected by means of a generally U-shaped yoke 41 having end portions 42 that are connected, as by studs 43, with the adjacent ends of the shut-off slides 35. The yoke 41 serves as a slide controlling part, lateral movement of which shifts the slides 35 into and out of open and shut positions. The grain and fertilizer hoppers are supported by any suitable means on the frame 11, such means including, among other things, a rear support member 45 in the form of a box strap that carries a pulley anchoring bracket 46 and a spring-receiving part 47. A spring 48 is connected at its inner end to the part 47 and at its outer end to a strap member 49 suitably secured, as by welding, to the yoke 41. The outer end of the strap member 49 is apertured to receive the spring 48 in either of two selected positions, and the inner end of the strap 49 is provided with an upturned abutment section 51 that cooperates with an abutment 52 on the support member 45 to limit the amount of movement that can be imparted to the yoke 41, and hence to the associated shut-off slides 35, by the action of the spring 48. A cable 55 is connected at its rear or laterally outer end to a connection member in the form of a saddle 56 that is welded to the end of the slide control yoke 41 opposite the spring-receiving strap 49. The cable 55 is passed around a pulley 57 that is rotatably mounted on the bracket 46, and from the pulley 57 the cable extends forwardly underneath the seed and fertilizer hoppers.

Rockably mounted on the lift shaft 27 is an arm member 61 to which the forward end of the cable section 55 is connected in any suitable way. The lower end of the arm 61 has an opening to receive the forward end of the cable section 55, and the upper end of the arm 61 is supported by a bearing member 63, preferably in the form of a collar having a non-circular opening 64 by which the bearing member 63 is non-rotatably associated with the lift shaft 27. The bearing member 63 has a hub section 65 on which the arm 61 is loosely mounted so as to be swingable, and a part in the form of a lug 66 is formed on a portion of the bearing member 63 and arranged to engage an abutment shoulder 67 formed on the upper portion of the swingable arm 61, the parts being arranged so that movement of the rockshaft 27 in the direction that raises the furrow openers brings the lug 66 into engagement with the shoulder portion 67 of the arm 61, thereby swinging the latter forwardly and exerting a pull on the cable 55, and shifting the yoke 41 and associated shut-off slides 35 in the direction to cause the latter to close off the discharge openings in the quantity control slides 31. This movement of the yoke 41 occurs against the tension exerted by the spring 48, and therefore when the furrow openers are lowered when it is again desired to plant, the spring 48 pulls the yoke 41 in a direction to shift the shut-off slides 35 into their open position.

Figure 3:
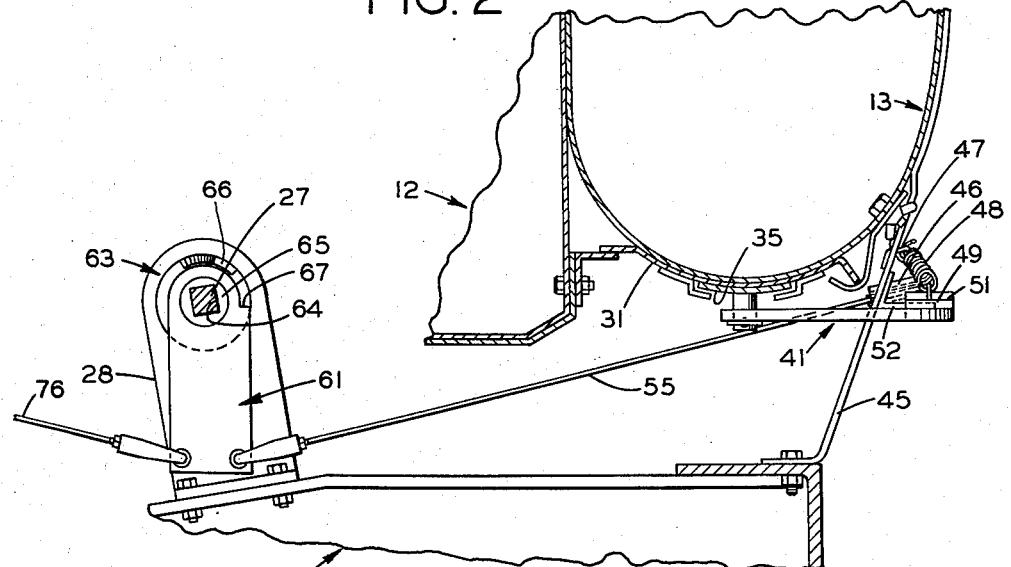
Fig. 3 is a sectional view taken generally along the line 3—3 of Fig. 2.

Thus, the shut-off slides 35 are opened and closed in response to movement of the rockshaft 27 in the furrow opener lowering or furrow opener raising direction. It will be seen from Fig. 3 that the connection 66, 67 between the arm 61 and the rockshaft 27 is in the nature of a one way connection inasmuch as the part 61 is free to swing clockwise (Fig. 3) relative to the shaft 27. By virtue of this construction, the arm 61 may be swung forwardly independently of the rockshaft 27, whereby, as pointed out in detail below, the slides 35 may be closed manually even though the furrow openers are lowered.

According to the present invention an additional means is provided for moving the shut-off slides 35 into a closed position independently of the position of the furrow opener controlling rockshaft 27. This means will now be described.

A post, preferably in the form of an angle 71, is fixed to the forward portion of the hitch frame 14 and is reenforced by suitable brace means 72. Mounted on the upper end of the post 71 by pivot means 73 is a hand lever 74, the latter being pivoted to the upper end of the post 71 for movement from an upright position forwardly and downwardly into a slide-closing position. The hand lever 71 is connected, as by a pivot 75, to a cable 76 that extends from the hand lever 74 rearwardly toward the swingable arm 61, being connected to the lower end of the latter adjacent the point of connection of the forward portion of the cable 55 thereto. The cable 76 may include a rod section 76a, if desired. A portion of the hand lever 74 extends below the pivot 73, as indicated at 78, and a relatively light spring 79 is connected to the portion 78 that extends downwardly and is connected, as at 81, to the upper portion of the post 71. The upper portion of the post 71 is provided with a stop 83 so located that when the hand lever 74 is swung downwardly and forwardly the point of connection 75 of the cable 76 with the hand lever 74 is carried to a point below a line connecting the pivot 73 with the point of connection of the rear end of the cable 76 with the swingable arm 61. This, therefore, defines an over-center position of the hand lever 74, as shown in Fig. 4, and normally the pull of the spring 48 that tends to open the slides 35 is sufficiently great to hold the lever 74 in its over-center position against the tendency of the relatively light spring 79 to return the hand lever 74 to its upright position. Thus, the hand lever 74 and associated parts serve as releasable latch means adapted to retain the slides 35 in closed position. However, the spring 79 will be effective to return the hand lever 74 to its upright position whenever the pull on the cable 76 is released. This will be referred to later.

As so far described, the slides 35 are opened whenever the furrow openers are lowered, and when the furrow openers are raised, the corresponding rocking of the rockshaft 27 acts through the lever arm 61 to pull the slides 35 into a closed position. However, under some conditions, it may be desired to momentarily close the slides even though the furrow openers are lowered. According to my invention, this may be done by swinging the hand lever 74 forwardly into its over-center position shown in Fig. 4. This will exert a pull on the cables 76 and 55 and move the slides 35 into their closed position against the action of the spring 48. However, it is not necessary to maintain a hold on the lever 74 to hold the slides closed, for the pull of the spring 48 is sufficient, as mentioned above, to hold the hand lever 74 in its over-center position.

In order to provide for subsequently automatically opening and closing the slides 35 in response to lowering and raising of the furrow openers, the present invention provides means whereby, after the hand lever 74 has been moved into a slide-closing over-center position, a subsequent raising of the furrow openers will automatically release the hand lever 74 from its over-center position so that, when the furrow openers are subsequently lowered, the slides 35 will automatically be opened. To this end, the hand lever 74 and associated parts are so constructed and arranged that when the hand lever 74 is in its forward or over-center position, the swinging arm 61 is not shifted to its forwardmost extent, but only sufficient to close the slides 35. Therefore, whenever at a subsequent time the rockshaft 27 is actuated to raise the furrow openers, there is imparted to the arm 61 a slight additional amount of movement. This serves to release the tension in the cable 76, whereupon the spring 81 immediately swings the hand lever 74 out of its over-center position (Fig. 4) and into an upright position (Fig. 1) so that when the furrow openers are lowered the spring 48 will immediately open the slides 35.

Thus, in case the operator should desire manually to close the shut-off slides 35 when he approaches the end of a row, the raising of the furrow openers into a transport position, as to turn at the end of the row, will automatically bring the slides 35 back under the control of the furrow opener raising and lowering shaft 27 even though the operator should forget to release the lever 74 when he starts forward on the next ground.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a material dispenser, a mobile frame, a hopper thereon, furrow opener means movably connected with the frame and adapted to be raised and lowered, means including a rockshaft carried by said frame and connected with said furrow opener means to raise and lower the latter, a flow controlling cut-off means carried by the hopper to control the flow therefrom, means connecting said cut-off means with said rockshaft, whereby movement of the latter into a raised position acts to move said cut-off means into a closed position, said connecting means including a part having a one way connection with said rockshaft, spring means connected with said cut-off means to open the latter when said furrow opener means is moved into a lowered position, manually operated latch means connected with said part to move the latter in a direction to close said cut-off means against the action of said spring means and thus retain said cut-off means in a closed position, and said latch means including means connected with said part and responsive to a subsequent movement of said part toward a raised position to release said latch means.

2. In a material dispenser, a mobile frame, a hopper carried thereby, an auxiliary flow controlling cut-off means carried by the hopper and movable into open and shut position, furrow opener raising and lowering means carried by said frame, said last-mentioned means including a rockable lift shaft and means acting against said frame for rocking said shaft, an arm movable on said shaft, a part fixed to said shaft adjacent said arm and adapted to engage and shift said arm into a cut-off closing position when the raising and lowering means is shifted into a furrow opener raised position, means connecting said arm with said cut-off means for closing the latter when said arm is moved by said raising and lowering means into said cut-off closing position, separate means carried by said frame and connected with said arm for closing said cut-off means independently of the movement of the raising and lowering means, releasable means latching said separate means in a position holding said cut-off means closed, and means connected with said releasable means and actuated by said part for releasing said releasable means.

3. In a material dispenser, a mobile frame, a rockshaft carried by said frame, a hopper carried by said frame, flow control means for said hopper comprising a movable member, an arm swingable on said rockshaft, a connection between said arm and member, a collar secured on said rockshaft adjacent said arm, a lug secured on said collar and engageable with said arm to swing the latter in one direction when said shaft is rocked in that direction, and means carried by said frame and connected with said arm to swing the latter and shift said movable member independently of said rockshaft.

4. In a material dispenser, a frame, a hopper thereon, a rockshaft carried by said frame, flow control means for the hopper comprising a movable member, a bearing member connected to turn with said rockshaft and having arm-receiving means, an arm swingable on said arm-receiving means, a connection between said arm and said movable member, a lug on said bearing member engageable with said arm to swing the latter in one direction when said shaft is rocked in that direction, and means carried by said frame and connected with said arm to swing the latter and shift said movable member independently of said rockshaft.

5. In a material dispenser having a frame, a hopper carried thereby, a rockshaft on said frame forward of the hopper, an arm swingable on the rockshaft, a control slide movable along the bottom of the hopper, a support part connecting the hopper at the rear side thereof with said frame, a slide shifting part connected with said slide and disposed at the rear side of said hopper adjacent said support part, a spring connected at one end with said support part and at the other end with said slide shifting part for shifting the slide in one direction, a pulley anchored to said support, a cable connected at one end with said slide shifting part and passed over said pulley and extending forwardly to a point adjacent said rockshaft, a forward pull exerted on said cable acting to shift said slide in the other direction, means secured on the rockshaft and acting between the rockshaft and said arm for swinging the latter and shifting said cable forwardly and means connected with said rockshaft arm for shifting said cable forwardly independently of movement of the rockshaft.

6. In a material dispenser, a frame, a hopper carried thereby, an auxiliary flow controlling cut-off means carried by the hopper and movable into open and shut positions, furrow opener raising and lowering means carried by said frame, said last-mentioned means including a rockable lift shaft, an arm movable on said shaft, a part fixed to said shaft adjacent said arm and adapted to engage and shift said arm when the raising and lowering means is shifted into a furrow opener raised position, means connecting said arm with said cut-off means for closing the latter when said arm is moved by said raising and lowering means, separate means connected with said arm for closing said cut-off means, and releasable means retaining said separate means in a position holding said cut-off means closed.

7. In a material dispenser, a mobile frame, a hopper thereon, furrow opener means adapted to be raised and lowered relative to the frame, a flow controlling cut-off means movably carried by the hopper, continuously biased means connected with the cut-off means for continuously urging the latter to move into an open position, means connected with said cut-off means and said furrow opener means to raise the latter and simultaneously close said cut-off means, said last mentioned means including a one-way acting means serving when said furrow opener means is lowered to accommodate opening of said cut-off means by said biasing means, releasable means connected with said cut-off means to close the latter when the furrow opener means is lowered, and biased means connected with said releasable means to release the latter.

8. In a material dispenser, a mobile frame, a hopper thereon, a flow control means connected with said hopper, spring means connected to shift said flow control means in one direction relative to the hopper, cable means connected with said flow control means to shift the latter in the other direction relative to the hopper, a hand lever movably mounted on the frame and connected with said cable means and swingable into an over-center position and acting through said cable means to releasably hold said flow control means in one position, and spring means connected to act between said frame and said hand lever to swing the latter out of over-center position when tension in said cable means is relaxed.

9. In a material dispenser, a mobile frame, a hopper carried thereby, a flow control cut-off means on the hopper, spring means connected to shift said slide in one direction relative to the hopper, cable means connected with said cut-off means to shift the latter in the other direction relative to the hopper, a hand lever carried by the frame and connected with said cable means and swingable into an over-center position and acting through said cable means to releasably hold said cut-off means in one position, a spring connected to act between the hand lever and the frame to urge said hand lever out of its over-center position, and means movable relative to the frame and connected with said cable means to shift the latter in a direction to relax the pull thereof against said lever and thereby allow said spring to swing said hand lever out of its over-center position.

10. In a material dispenser, a mobile frame, a hopper carried thereby, a flow control cut-off means on the hopper, spring means connected to shift said cut-off means in one direction relative to the hopper, cable means connected with said cut-off means to shift the latter in the other direction relative to the hopper, a hand lever carried by the frame and connected with said cable means and swingable into an over-center position and acting through said cable means to releasably hold said cut-off means in one position, a spring connected to act between the hand lever and the frame to urge said hand lever out of its over-center position, said spring being substantially weaker than said spring means, whereby the latter, after said hand lever has been swung into an over-center position, acts through said cable to hold said lever in said position against the force exerted by said spring, and means movable relative to the frame and connected to said cable means to shift the cut-off means an additional amount in said one direction against the bias of said spring means thereby relieving said cable of the bias of said spring means and thus relaxing the pull of the cable means on said hand lever, whereby said spring swings the hand lever out of its over-center position.

11. In a material dispenser, a mobile frame, a hopper thereon, a flow control means carried by the hopper, spring means connected to shift said flow control means in one direction relative to the hopper, cable means connected with said flow control means to shift the latter in the other direction relative to the hopper, a hand lever carried by the frame and connected with said cable means and swingable into an over-center position and acting through said cable means to releasably hold said flow control means in one position, a spring connected to act between the hand lever and the frame to urge said hand lever out of its over-center position, said spring being substantially weaker than said spring means, whereby the latter, after said hand lever has been swung into an over-center position, acts through said cable to hold said lever in said position against the force exerted by said spring, and means movable relative to the frame and connected to said cable means to shift the latter an amount sufficient to overcome the pull of said spring means, whereby said spring swings the hand lever out of its over-center position.

References Cited in the file of this patent

UNITED STATES PATENTS

| | | |
|---|---|---|
| 33,664 | Richmond | Nov. 5, 1861 |
| 508,321 | Johnson | Nov. 7, 1893 |
| 1,294,629 | Davis | Feb. 18, 1919 |
| 1,932,450 | Dyrr | Oct. 31, 1933 |
| 2,410,937 | Harder | Nov. 12, 1946 |
| 2,687,307 | Austermiller | Aug. 24, 1954 |
| 2,698,114 | Buhr | Dec. 28, 1954 |
| 2,762,535 | Kriegbaum | Sept. 11, 1956 |
| 2,768,767 | Hyland et al. | Oct. 30, 1956 |
| 2,768,773 | Bjerre | Oct. 30, 1956 |
| 2,817,460 | Bond | Dec. 24, 1957 |
| 2,854,172 | Buhr | Sept. 30, 1958 |
| 2,890,666 | Schnell | June 16, 1959 |